Figure 3:
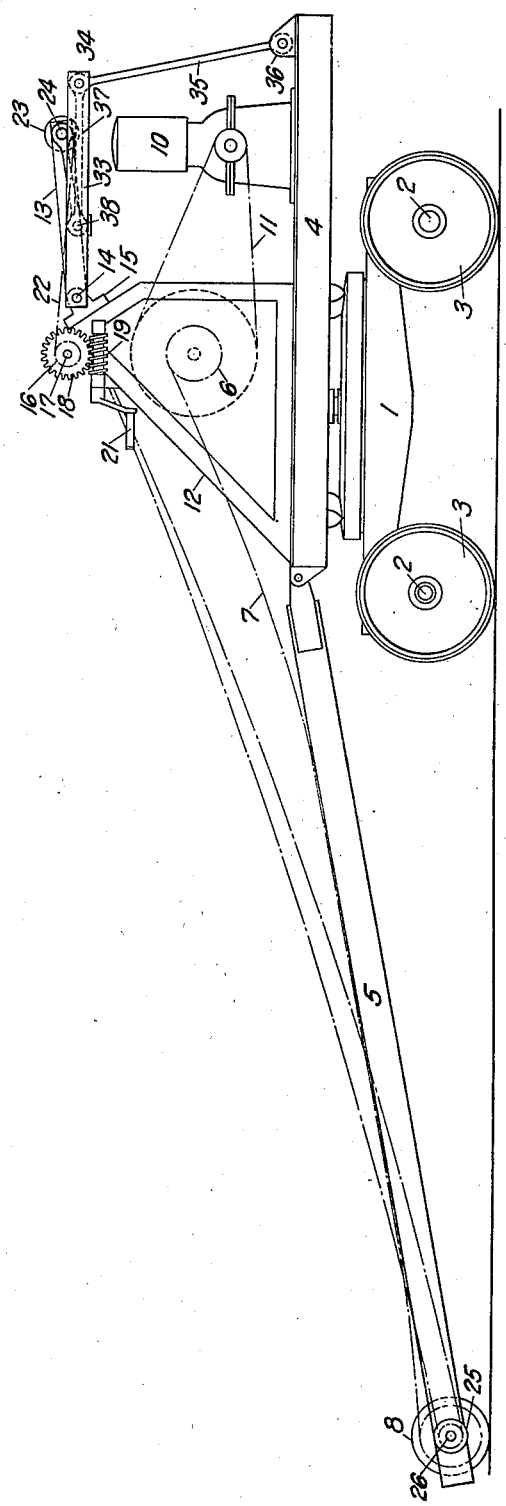

Nov. 3, 1925.
E. J. ARMSTRONG
1,560,194
CRANE OR THE LIKE
Filed Sept. 4, 1923
2 Sheets-Sheet 1
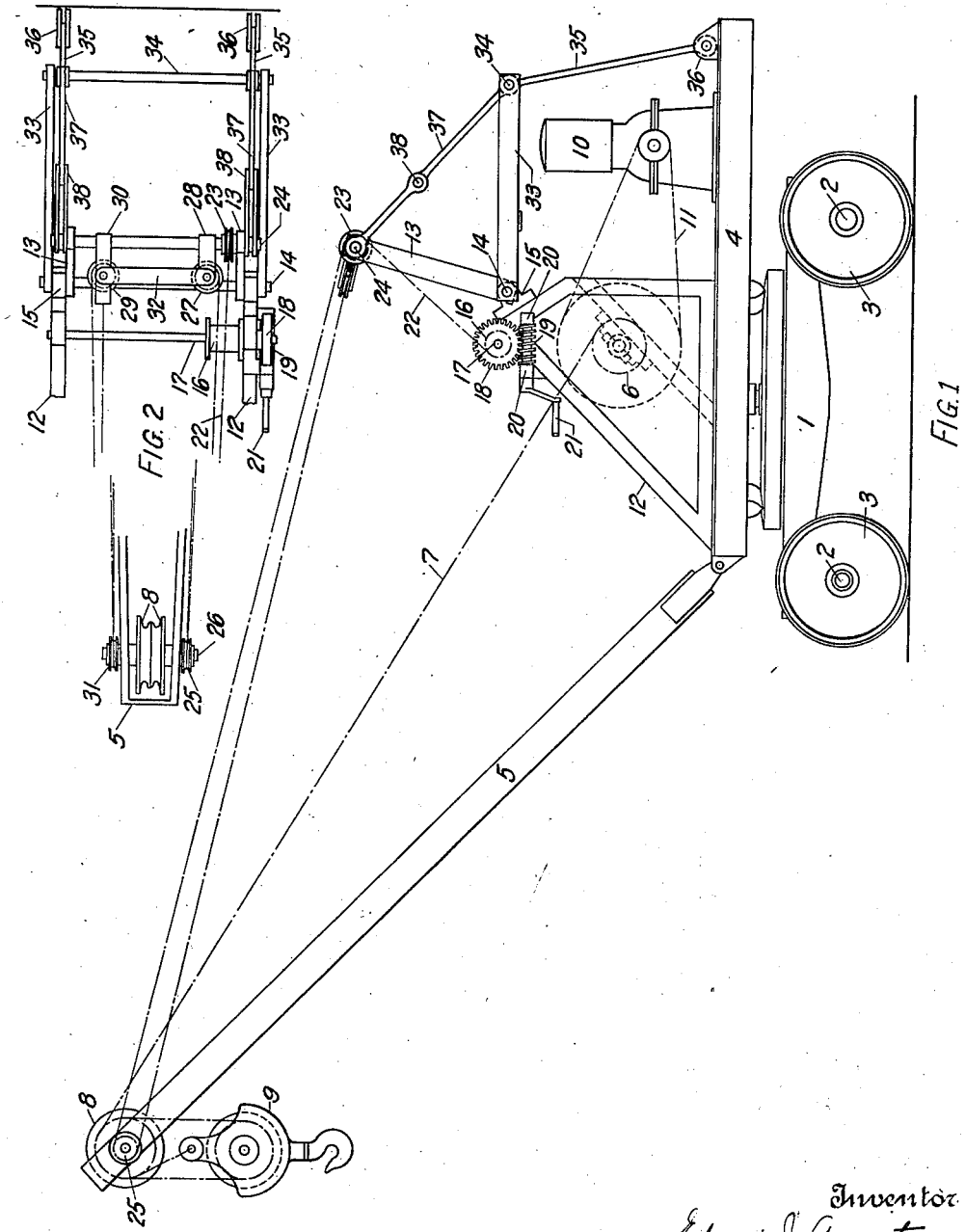

Nov. 3, 1925.

E. J. ARMSTRONG

CRANE OR THE LIKE

Filed Sept. 4, 1923

1,560,194

2 Sheets-Sheet 2

Inventor
Edwin J. Armstrong
By N. T. Lord
Attorney

Patented Nov. 3, 1925.

1,560,194

UNITED STATES PATENT OFFICE.

EDWIN J. ARMSTRONG, OF ERIE, PENNSYLVANIA, ASSIGNOR, BY DIRECT AND MESNE ASSIGNMENTS, TO ERIE STEAM SHOVEL COMPANY, OF ERIE, PENNSYLVANIA, A CORPORATION OF PENNSYLVANIA.

CRANE OR THE LIKE.

Application filed September 4, 1923. Serial No. 660,774.

*To all whom it may concern:*

Be it known that I, EDWIN J. ARMSTRONG, a citizen of the United States, residing at Erie, in the county of Erie and State of Pennsylvania, have invented new and useful Improvements in Cranes or the like, of which the following is a specification.

Cranes and similar implements such as steam shovels having platforms with an extending boom are necessarily provided with struts for supporting the boom and where these machines are loaded on to cars it is necessary to remove the platform from the supporting frame wheel in order to drop the mechanism down to a place that will give clearance in the ordinary car. The present invention is designed to obviate this difficulty by building the power element at a clearance level and providing a collapsible strut which may be dropped down as the boom is lowered so that the implement as a whole may be run on to the car and without taking it down have a height which will give the necessary clearance.

The invention is illustrated in the accompanying drawings as follows:—

Fig. 1 shows a side elevation of a crane.

Fig. 2 a plan view of the boom actuating mechanism.

Fig. 3 a side elevation with the crane lowered and strut collapsed in position for shipment.

1 marks the frame, 2 the axles on which the frame is mounted, 3 the wheels on the axles, 4 a swinging platform mounted on the frame, 5 a hinged boom extending from the platform, 6 a drum on the platform, 7 a line running from the drum, 8 sheaves at the end of the drum over which the line 7 runs and 9 a hoisting device which may be of any character. The drum is driven from a motor 10 (as shown a gasoline motor) with a driving chain, 11. The parts so far as described may be of any desired construction except that the power element should be low enough to clear.

The drum is mounted between posts 12 which extend upwardly at each side of the drum from the platform 4. A strut 13 is hinged on a rod 14 mounted in brackets 15 on the posts 12. A drum 16 is mounted on a shaft 17 carried by the posts 12. A worm gear 18 is locked with the drum and is operated by a worm 19, the worm being carried by bearings 20 on the posts 12 and operated by a crank 21.

A line 22 extends from the drum 16 over a sheave 23 on a shaft 24 extending between the struts 13. The line 22 is carried forward over a sheave 25 mounted on a pin 26 extending through the end of the boom. The line is carried back and around a sheave 27 mounted on a strap 28 extending from the shaft 24 and around a sheave 29 on a strap 30 also extending from the rod or shaft 24. The line is then carried to the boom and carried around a sheave 31 at the opposite side from the sheave 25 and back to the strap 30. A brace 32 extends from the strap 28 to the strap 30 so as to take the strain of the line on the sheaves. It will readily be seen that by operating the drum 16 the boom may be raised and lowered and that as the boom is lowered and sufficient slack given to the line the strut 13 may be swung downwardly.

Thrust bars 33 are mounted on the rod 24 and extend rearwardly and a rod 34 connects the rear ends of the bars 33. Links 35 extend from the rod 34 to anchor brackets 36 on the platform. A link 37 extends from the rod 34 to the rod 24. The links 35 and 37, therefore, receive the strain of the strut incident to carrying the boom through the line 22. The link 37 is hinged at 38 the hinge being located to permit the strut 13 to be folded down on the bars 33 as shown in Fig. 3. With the parts in this position the crane is low enough so that it may be put on the ordinary flat car and give sufficient clearance and this is accomplished without the removal of the platform from the frame which is the usual practice.

What I claim as new is:—

In a crane of the like, the combination of a platform; a drum on the platform; posts on which the drum is mounted; a hinged strut mounted on the posts comprising members at each side of the drum; a boom hinged on the platform; supports running from the strut members to the boom; thrust bars extending rearwardly from the strut members; collapsible connection between the thrust bars and the strut members; and links between the thrust bars and the platform.

In testimony whereof I have hereunto set my hand.

EDWIN J. ARMSTRONG.